Sept. 21, 1965 S. S. SCHODOWSKI 3,208,007

CAPACITIVE NETWORK FOR CRYSTAL COMPENSATION

Filed Dec. 5, 1961 2 Sheets-Sheet 1

INVENTOR.
STANLEY S. SCHODOWSKI

BY Jack H. Linscott

ATTORNEY

CAPACITIVE NETWORK FOR CRYSTAL COMPENSATION

Filed Dec. 5, 1961 2 Sheets-Sheet 2

*INVENTOR,*
STANLEY S. SCHODOWSKI
*BY* Jack H. Linscott
ATTORNEY 3,208,007
Patented Sept. 21, 1965

3,208,007

CAPACITIVE NETWORK FOR CRYSTAL COMPENSATION

Stanley S. Schodowski, Asbury Park, N.J., assignor to the United States of America as represented by the Secretary of the Army Filed Dec. 5, 1961, Ser. No. 157,281
4 Claims. (Cl. 331—70)
(Granted under Title 35, U.S. Code (1952), sec. 266)

Figure 1:
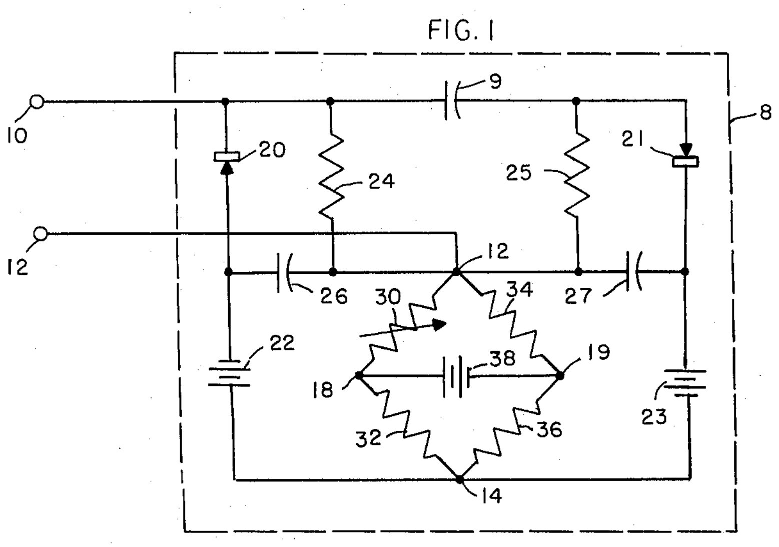

The invention described herein may be manufactured and used by or for the Government for governmental purposes without the payment of any royalty thereon.

This invention relates to variable capacitive networks, and particularly to capacitive networks varying with temperature. More particularly, this invention relates to capacitive networks that vary with temperature in a manner suitable for compensating for crystal frequency variations with respect to temperature.

The prior art includes many variable capacity devices; some operating mechanically, and some electrically. These may be adapted to respond to temperature as well as to other conditions, and some of them may be used to compensate for crystal frequency variations with respect to temperature.

The electrical means, including such devices as the variable capacity diodes, can most easily be adapted to compensate for the frequency variations of the crystal, but, usually, only for a limited range of temperatures, with the useful correction confined to the substantially linear or uniformly varying portions of the whole, complex, curve of crystal frequency variations with respect to temperature.

The frequency variations of a crystal with respect to temperature can also be controlled to a certain degree by the use of temperature stabilizing ovens. These have the further advantage that they can be set to an ideal temperature; for example, the temperature of the upper turning point of the frequency-temperature curve of an AT cut quartz crystal, where the frequency will have a minimum change within the possible variation of the temperature of the oven. However even the oven cannot maintain a stable enough frequency over a broad ambient temperature range for modern communication.

It is therefore an object of this invention to provide a capacitive network that gives improved compensation of the frequency variation of a crystal with respect to temperature.

It is a further object of this invention to provide an improved temperature-sensitive network, having a parabolic variation in capacity with respect to temperature, suitable for correction of the changes in the frequency of a crystal with respect to temperature.

It is a further object of this invention to provide an improved network, utilizing variable capacity diodes, that may be used, in conjunction with a temperature stabilizing oven, to compensate for the variation in the frequency of an AT cut crystal with respect to temperature in the temperature range of the upper turning point of its characteristic curve.

These and other objects are accomplished by connecting a pair of variable capacity diodes in parallel with the diodes oppositely polarized and oppositely biased, with respect to each other, and connecting the parallel diodes in series with a temperature-sensitive bridge that supplies a substantially linear variation in voltage with respect to temperature, across the parallel-connected, variable-capacity diodes.

This will cause the effective capacity of the network to decrease as the temperature is increased, until a certain level is reached, and then to increase as the temperature is further increased.

This network is used in conjunction with an AT cut crystal and is adjusted so that the temperaure, at the certain level where the effective capacity of the network is a minimum, coincides with the upper turning point temperature of the AT cut crystal.

At least the crystal and the temperature sensing element of the network must be contained within the same oven to maintain both elements at the same temperature.

This invention will be better understood, and other and further objects of this invention will become apparent from the following specification and the drawings, of which FIGURE 1 is a circuit diagram of a typical, variable capacity network according to this invention.

Figure 2:
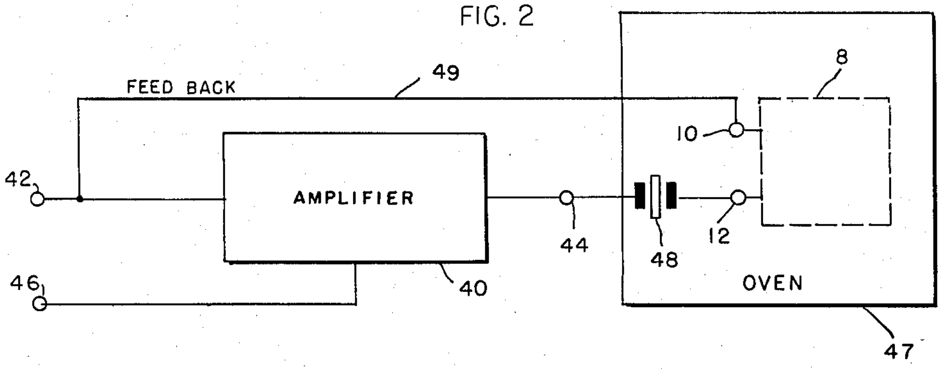

FIGURE 2 shows a block diagram of an oscillator including a crystal and the variable capacity network of FIGURE 1.

FIGURES 3, 4, 5, and 6 show the characteristic curves of the AT cut crystal, the variable capacity diodes, and their combined effects with respect to temperature.

Referring now more particularly to FIGURE 1, the network 8 has input terminals 10 and 12. The input terminal 10 is connected directly to the cathode of the variable capacity diode 20 and through the coupling condenser 9 to the anode of the variable capacity diode 21.

The cathode of the variable capacity diode 20 is connected to the potential of the other input terminal 12 through the resistor 24. The anode of the variable capacity diode 21 is also connected to the potential of the input terminal 12, through the resistor 25.

The anode of the diode 20 is connected to the negative terminal of the biasing battery 22 and is grounded, for alternating currents, through the condenser 26 to the input terminal 12. The cathode of the diode 21 is connected to the positive terminal of the biasing battery 23 and is grounded, for alternating currents, through the condenser 27 to the input terminal 12.

The other terminals of the biasing batteries 22 and 23 are connected to the common point 14 of a temperature sensitive bridge.

The point of the temperature sensitive bridge opposing 14 is connected to the input terminal 12. The diagonal points of the bridge are 18 and 19, which are connected to the terminals of the biasing battery 38. The arms of the bridge are the resistors 30, 32, 34, and 36, with at least one of the arms of the bridge, in this case 30, being a temperature sensitive resistor. The bridge is so connected that the resistor 30, which varies with temperature, causes the biasing battery 38, to produce a control voltage that decreases as the temperature increases.

In operation, the diodes are connected across the opposing bridge points 12 and 14, through the resistors 24 and 25, and the biasing batteries 22 and 23 respectively. The diode 20 is biased to decrease in capacity as the voltage at point 14 becomes less positive with respect to the voltage at point 12 and the diode 21 is biased to increase in capacity as the voltage at point 14 become more negative with respect to the voltage at point 12.

The combined effect of the network across the input terminals 10 and 12 is to produce a capacitive effect that will first decrease as the temperature increases, and then increase as the temperature is increased still further.

In other words the capacitive effect of the network across terminals 10 and 12 is first dominated by the higher capacity of the diode 20, at lower temperatures, and then by the higher capacity of the diode 21, at higher temperatures.

This network may be adapted to be used with any circuit where this particular curve of capacity change with respect to temperature is required. It may function as an element of a tuned circuit, or merely a reactive impedance. However, this circuit is primarily intended for the compensation of the frequency variation at the upper turning point of the characteristic curve of an AT cut crystal, and to supplement a temperature stabilizing oven that holds the temperature of the crystal and the network at the level of this point on the characteristic curve.

The circuit of FIGURE 2 shows a block diagram of a typical circuit wherein the variable capacity network can be used in conjunction with a crystal. In this case the circuit has the elements of an oscillator; an amplifier 40, having an output terminal 44 feeding back through the crystal 48, the variable capacity network 8, and the line 49 to the input terminal 42. All terminals being considered with respect to a ground or common terminal 46. The crystal establishes the frequency of the positive feedback and the amplifier 40 overcomes the circuit losses.

Both the crystal and the variable capacity temperature compensating network are situated in an oven 47, which will stabilize the temperature, insure that both the crystal and the compensating network are effected by the same oven temperature, and raise and hold the temperature within a region wherein the circuit will function most effectively.

Figure 3:
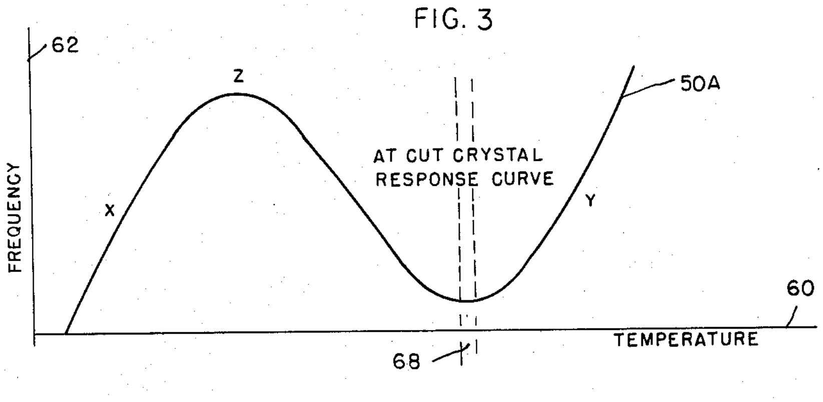

In this case, with an AT cut crystal, the region about the temperature at the lowest frequency point in the upper turning point 68 of the characteristic curve which is seen in FIGURE 3 is used because the curve of the frequency of the crystal with respect to temperature within that region is the most nearly similar to the curve of the reactive impedance of the compensating network with respect to temperature. Within that region of temperatures, the most accurate compensation of the crystal frequency with respect to temperature can be obtained.

The manner in which this variable capacity network compensates for the shift in the crystal frequency with respect to temperature can be seen in the curves of FIGURES 3, 4, 5, and 6. In all of these figures, the temperature axis of the graphs are aligned one above the other for a clearer understanding of the inter-relation of the functions.

FIGURE 3 shows a typical curve 50A of the frequency 62 with respect to temperature 60 of an AT cut crystal. The frequency of this cut is, actually, comparatively stable over the range between X and Y wherein it is changing directions, but even this is not enough to provide the stability of frequency control required, and to cover the range of temperatures encountered, in modern communications. The most stable regions provided by the curve 50A are in the neighborhood of the upper turning point Z and the lower turning point 68 which is used in this application.

Figure 4:
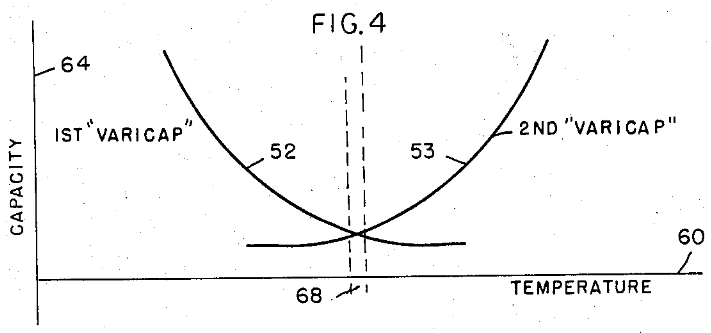

FIGURE 4 shows the capacity 64 of the two diodes 20 and 21 with respect to the temperature 60 that controls their respective bias voltage. The first diode 20 is so biased that the decrease in voltage at 14 with respect to 12 causes a decrease in the capacity of the diode within the range of temperature of interest in this application. This is seen in the curve 52.

The second diode 21 is so polarized and biased with respect to the other diode and the network that the same decrease in the voltage at 14 with respect to 12, increases the capacity of the diode 21. This is seen in the curve 53.

Figure 5:
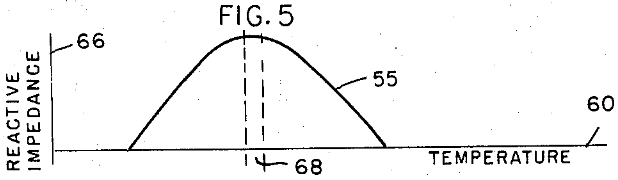

The combination effect, across terminals 10 and 12, of these two variable capacity diodes in parallel gives the reactive impedance 66 with respect to temperature 60 as seen in the curve 55 of FIGURE 5.

Figure 6:
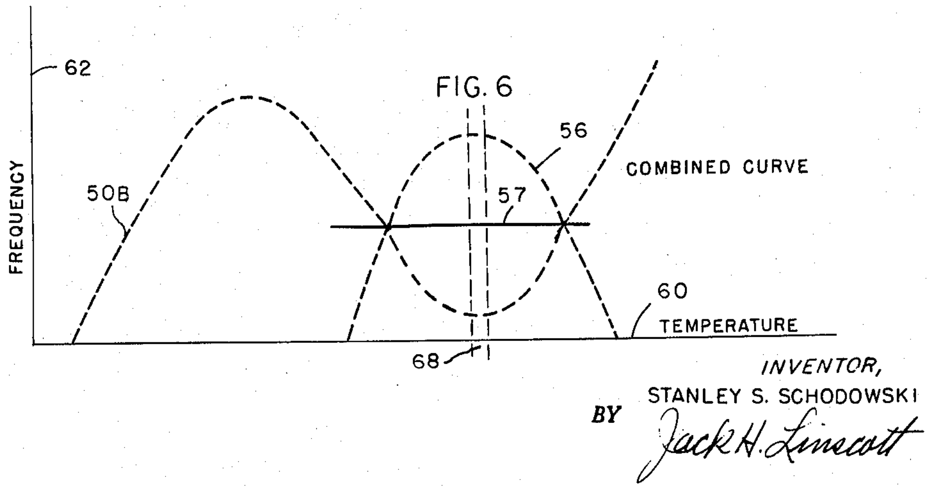

The combined effects of the variable capacity network and the crystal on the frequency of the circuit, with respect to temperature, are seen in the curves of FIGURE 6. The curve 50B is the same typical curve of frequency 62 with respect to temperature 60 of an AT cut crystal. This is the same as the curve 50A of FIGURE 3. The curve 56 is the effect of the compensating network 8, on the overall circuit frequency and has the same characteristic with respect to temperature as the curve 55 of FIGURE 5.

With both of the curves 50B and 56 aligned so that their respective high and low points are at the same mean temperature 68, the resultant curve of the frequency of the combined circuit of FIGURE 2 with respect to temperature would be the compensated curve 57. This curve will be substantially straight over the range shown if the various elements and bias voltages are chosen and adjusted correctly. Over this range of temperatures the frequency can be maintained with a very high degree of stability.

The oven 47 of FIGURE 2 can be adjusted to hold the temperature of the crystal and the capacitive network in the vicinity of 68, and even if the temperature control of the oven is relatively poor, or is unable to respond adequately to extreme changes, it can be seen that the frequency of the circuit of FIGURE 2 will be held extremely constant over a very wide range of temperatures adjacent to 68.

It can also be seen that, with this compensating circuit used in conjunction with the oven, the actual means temperature of the oven will not be nearly as critical as that for the use of the oven with the crystal alone, which must be exactly at the low point of the curve for the best results.

As noted earlier, this variable capacity network is not limited to use in this particular circuit, nor to use with the circuit elements shown. This variable capacity network may be combined with other condensers, both fixed and variable, or inductors, or combinations of these and other circuit elements to ultilize this particular compensation curve or modify it according to the teachings of the art.

The bias batteries may be replaced by any of several well known sources of direct current, or means for obtaining direct current.

The temperature controlled variable resistance can be used in any of the arms, or in more than one of the arms at a time. Any of the several types of temperature sensitive resistors can be used, as long as the change in the control voltage across the diode network for a given change in temperature is correct for the polarities involved.

In a typical embodiment of this invention, an AT cut quartz crystal is used, fundamentally operated, and having an upper turning point (68 of FIGURE 3) at 90 degrees centigrade. Such a crystal is manufactured by the Scientific Radio Company of Loveland, Colorado, and operates with a rated load capacity of 30 micromicrofarads.

The variable capacity diodes 20 and 21 are p.s.i. V–10 "varicaps," manufactured by Pacific Semiconductors Incorporated; the temperature controlled resistor 30 is a QA–51–J1 "thermistor," manufacutred by Fenwal Electronics Inc. of Framingham, Mass., and is rated at 100,000 ohms at 25 degrees centigrade.

The condensers 9, 26, and 27 are .02 microfarads; the resistors 24 and 25 are 100,000 ohms; the resistor 34 is 10,000 ohms; and the resistors 32 and 36 are variable between 0 and 15,000 ohms to control the sensitivity and to provide a null balance, respectively.

The direct current sources of potential 22 and 23 are 4 volts and 38 is 15 volts.

A 100,000 ohm variable resistor, not shown, may be used across the thermistor 30 to control the linearity of the network, and a variable condenser, not shown, having a range between .5 and 8 micromicrofarads may be used across the terminals 10 and 12 of the network.

What is claimed is:

1. A frequency compensating network for use in combination with a crystal whose frequency increases as the temperature rises, up to a first temperature, decreases as the temperature rises between said first and a second temperature, and increases as the temperature rises above said second temperature comprising; a first variable capacity diode having an anode and a cathode; a second variable capacity diode having an anode and a cathode; a first source of bias voltage having a positive terminal and a negative terminal; a second source of bias voltage having a positive terminal and a negative terminal; the negative terminal of said first source of bias voltage connected to the anode of said first diode; the positive terminal of said second source of bias voltage connected to the cathode of said second diode; a resistive bridge having one temperature sensitive arm; a source of voltage connected across one pair of terminals of said bridge; one terminal of the other pair of terminals of said bridge connected to the positive terminal of said first source of bias voltage and to the negative terminal of said second source of bias voltage; the other terminal of the other pair of terminals of said bridge connected to a first terminal; a first resistor connected between the cathode of said first diode and said first terminal; a second resistor connected between the anode of said second diode and said first terminal; a first condenser connected between the anode of said first diode and said first terminal; a second condenser connected between the cathode of said second diode and said first terminal; a third condenser connected between the cathode of said first diode and the anode of said second diode; a second terminal connected to the cathode of said first diode; whereby the capacity across said first and second terminals varies with the temperature; and means for connecting said first and second terminals to a circuit including said crystal to maintain its frequency constant at temperatures above said first temperature.

2. In combination with a frequency compensating network as in claim 1, an oven surrounding said crystal and said temperature sensitive arm; and means for maintaining said oven at said second temperature.

3. In combination with a frequency compensating network as in claim 1, an amplifier having input and output terminals, means for connecting said frequency compensating network and said crystal in a feedback circuit between said output and said input terminals to cause said amplifier to oscillate at the compensated frequency established by said crystal.

4. In combination with a frequency compensating network as in claim 1, an oscillator tuned to the frequency of said crystal between said first and second temperatures; and means for coupling said crystal and frequency compensating network to said oscillator to maintain its frequency constant at temperatures above said first temperature.

References Cited by the Examiner

UNITED STATES PATENTS

| | | | |
|---|---|---|---|
| 2,191,315 | 2/40 | Guanella | 332—30 X |
| 2,731,564 | 1/56 | Edlstein | 331—158 |
| 3,054,966 | 9/62 | Etherington | 331—116 X |
| 3,068,427 | 12/62 | Weinberg | 331—158 X |

ROY LAKE, *Primary Examiner.*